(12) United States Patent
Kuga

(10) Patent No.: US 6,198,518 B1
(45) Date of Patent: Mar. 6, 2001

(54) LIQUID CRYSTAL DISPLAY APPARATUS

(75) Inventor: Kaeko Kuga, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 08/353,278

(22) Filed: Dec. 5, 1994

(30) Foreign Application Priority Data

Dec. 7, 1993 (JP) .................................................. 5-306685

(51) Int. Cl.⁷ ................................................ G02F 1/1335
(52) U.S. Cl. ............................................................ 349/71
(58) Field of Search .............................. 359/50; 349/71

(56) References Cited

U.S. PATENT DOCUMENTS 4,976,514 * 12/1990 Murata et al. ......................... 359/50
5,206,747 * 4/1993 Wiley et al. ............................ 359/51

* cited by examiner

*Primary Examiner*—Kenneth Parker
(74) *Attorney, Agent, or Firm*—Arent Fox Kintner Plotkin & Kahn, PLLC

(57) ABSTRACT

A light emitting layer containing a fluorescent material is provided on the back surface of a liquid crystal panel. External light transmitted by the liquid crystal panel and incident on the light emitting layer causes the light emitting layer to emit light to illuminate the back surface of the liquid crystal panel. Moreover, the light emitting layer is formed as an anisotropic conductive light emitting layer in which the current flow is allowed only along the thickness of the anisotropic conductive light emitting layer. An electronic part for driving liquid crystal is mounted on the anisotropic conductive light emitting layer and connected to the electrodes of the liquid crystal panel through the anisotropic conductive light emitting layer.

3 Claims, 4 Drawing Sheets

LIQUID CRYSTAL DISPLAY APPARATUS

BACKGROUND OF THE INVENTION

1. Field of the Invention

The present invention relates to a liquid crystal display apparatus, and more specifically, to a liquid crystal display apparatus provided with a light emitting layer.

2. Description of the Prior Art

In recent years, liquid crystal display apparatuses have frequently been used as information displaying means for use in various apparatuses such as word processors, television receivers and personal computers. Liquid crystal display apparatuses are designed to obtain a desired display pattern by using an optical change of liquid crystal caused by applying a voltage between two opposite electrodes of a liquid crystal panel made by enclosing liquid crystal between two transparent plates each including a transparent electrode.

However, since liquid crystal itself emits no light, to recognize the display pattern, it is necessary to use external light or to provide some kind of light source. As methods to directly view the display pattern of the liquid crystal panel, a reflection type and a transmission type are known. In the reflection type, a reflecting plate is provided on the back surface of the liquid crystal panel, and external light incident on the liquid crystal panel is reflected by the reflecting plate. In the transmission type, a light source is provided on the back surface of the liquid crystal panel, and light from the light source is transmitted by the liquid crystal panel.

A reflection-type liquid crystal display apparatus, which requires no light source in the apparatus, has advantages that the power consumption is very low and that the size and weight of the apparatus can be reduced. However, since external light is used, it is difficult to view the display pattern at dark places.

With a transmission-type liquid crystal display apparatus in which light is supplied from the light source, a bright display pattern can always be viewed at any places. However, since the light source is incorporated, the size of the apparatus increases, so that it is difficult to mount it in a small-size electronic apparatus. In addition, the power consumption increases. As the back light source provided on the back surface of the liquid crystal panel, a fluorescent lamp and an electroluminescence (EL) light source are widely used.

Referring to FIG. 1, there is shown a liquid crystal display apparatus using a fluorescent lamp as the back light source. Within a fixing frame member 1 having a display window at its upper surface, a liquid crystal panel 2, a plate-form back light 5 and a back cover plate 7 are provided. The liquid crystal panel 2 includes two transparent plates 2a and 2b each having on its inner surface a transparent electrode comprising indium tin oxide (ITO). Liquid crystal is enclosed between the transparent plates 2a and 2b. In the periphery of the liquid crystal panel 2, circuit boards 4a and 4b each having an electronic part for driving the liquid crystal are arranged. The electronic parts are mounted on flexible boards 3a and 3b, respectively, by the tape automated bonding (TAB) method. The end portions of the flexible boards 3a and 3b are each connected to an electrode pattern at a periphery of the liquid crystal panel 2. The back light 5 includes fluorescent lamps 5b and 5c arranged below the circuit boards 4a and 4b and a transparent plate 5a arranged to connected the fluorescent lamps 5b and 5c and having a light intercepting plate. Cushioning materials 6a and 6b are provided between the under surface of the liquid crystal panel 2 and the under surfaces of the circuit boards 4a and 4b, and the back light 5, and cushioning materials 8a and 8b are provided between the back light 5 and the back cover plate 7. Thus, the back light 5 is supported.

In the above-described arrangement, a voltage is applied to the electrodes of the liquid crystal panel 2 by the electronic parts mounted on the circuit boards 4a and 4b, so that a display pattern is formed on the liquid crystal panel 2. The light from the fluorescent lamps 5b and 5c is directed by the transparent plate 5a to irradiate the back surface of the liquid crystal panel 2, and a part of the light is transmitted by the liquid crystal panel 2 in accordance with the display pattern. The display pattern is viewed by the eye by observing the transmitted light.

A liquid crystal display apparatus using as the back light an EL light source using light emission caused by applying an electrical field to a substance is described, for example, in Japanese Laid-open Patent Application No. H3-282419. In this prior art, as shown in FIG. 2, an EL back light panel 11 supported by a guide 10 at its end is arranged between a liquid crystal panel 2 and a circuit board 4 which are fixed to a fixing frame member 1. The liquid crystal panel 2 is connected to the circuit board 4 by a conductive film 9. A voltage is applied to the electrodes by an electronic part (not shown) for driving the liquid crystal mounted on the circuit board 4, so that a display pattern is formed on the liquid crystal panel 2. The EL back light panel 11 emits fluorescence by being supplied with an electrical field by a non-illustrated power source, and the light is transmitted by the liquid crystal panel 2, so that a display pattern is viewed.

However, in either of the above-described transmission-type liquid crystal display apparatuses, a power source and a driving circuit to cause the fluorescent lamp and the EL back light source to emit light are necessary, which is an obstacle to the reduction in size and weight of the display apparatus and the apparatus in which the display apparatus is to be incorporated. In addition, in the liquid crystal display apparatus of FIG. 1 using the fluorescent lamp as the light source, since the circuit board for driving the liquid crystal panel 1 is arranged in the periphery of the liquid crystal panel 1, a frame member area B is large compared to an effective display area A.

In the liquid crystal display apparatus using the EL back light source, due to the electrical field applied to the EL back light source, static electricity may be generated on the liquid crystal panel and noise may be generated at the electronic part. These lead to a mis-operation of the liquid crystal display apparatus. For this reason, in the liquid crystal display apparatus of FIG. 2, it is necessary that a distance L1 between the EL back light source 11 and the liquid crystal panel 2 and a distance L2 between the EL back light source 11 and the circuit board 3 should be sufficiently large, so that the thickness of the apparatus increases.

SUMMARY OF THE INVENTION

An object of the present invention is to provide a liquid crystal display apparatus which provides a bright and clear display by using external light without using any power source for causing the back light to emit light.

Another object of the present invention is to reduce the size and weight of a liquid crystal display apparatus.

To achieve the above-mentioned objects, according to the present invention, a light emitting layer including a fluorescent material is provided on the back surface of a liquid crystal panel. The light emitting layer is formed as an anisotropic conductive light emitting layer where the current flow is allowed only along the thickness of the anisotropic conductive light emitting layer, and an electronic part for driving the liquid crystal display apparatus is mounted on the anisotropic conductive light emitting layer. A reflecting layer may be provided on the back surface of the light emitting layer.

In the structure where the light emitting layer is provided on the back surface of the liquid crystal panel, external light is transmitted by the liquid crystal panel and incident on the light emitting layer. The fluorescent material absorbs the energy of the light incident on the light emitting layer to emit fluorescence. The fluorescence is transmitted by the liquid crystal panel in accordance with a display pattern formed on the liquid crystal panel. Thereby, the display pattern is viewed by the eye.

By providing the reflecting layer on the back surface of the light emitting layer, the fluorescence emitted by the fluorescent material is mostly transmitted by the liquid crystal panel. Further, the external light incident on the light emitting layer is reflected by the reflecting layer and again transmitted by the liquid crystal panel, so that the light is reinforced to provide a brighter display.

In the arrangement where the anisotropic conductive light emitting layer is provided, no power source is necessary for the back light source and the electronic part for driving the liquid crystal is mounted on the light emitting layer, so that the size and weight of the apparatus can be reduced. That is, since the electronic part is not arranged in the periphery of the liquid crystal panel, the longitudinal and lateral sizes of the liquid crystal display apparatus can be reduced, and the thickness of the apparatus is small compared to the transmission-type liquid crystal display apparatuses requiring a light source.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
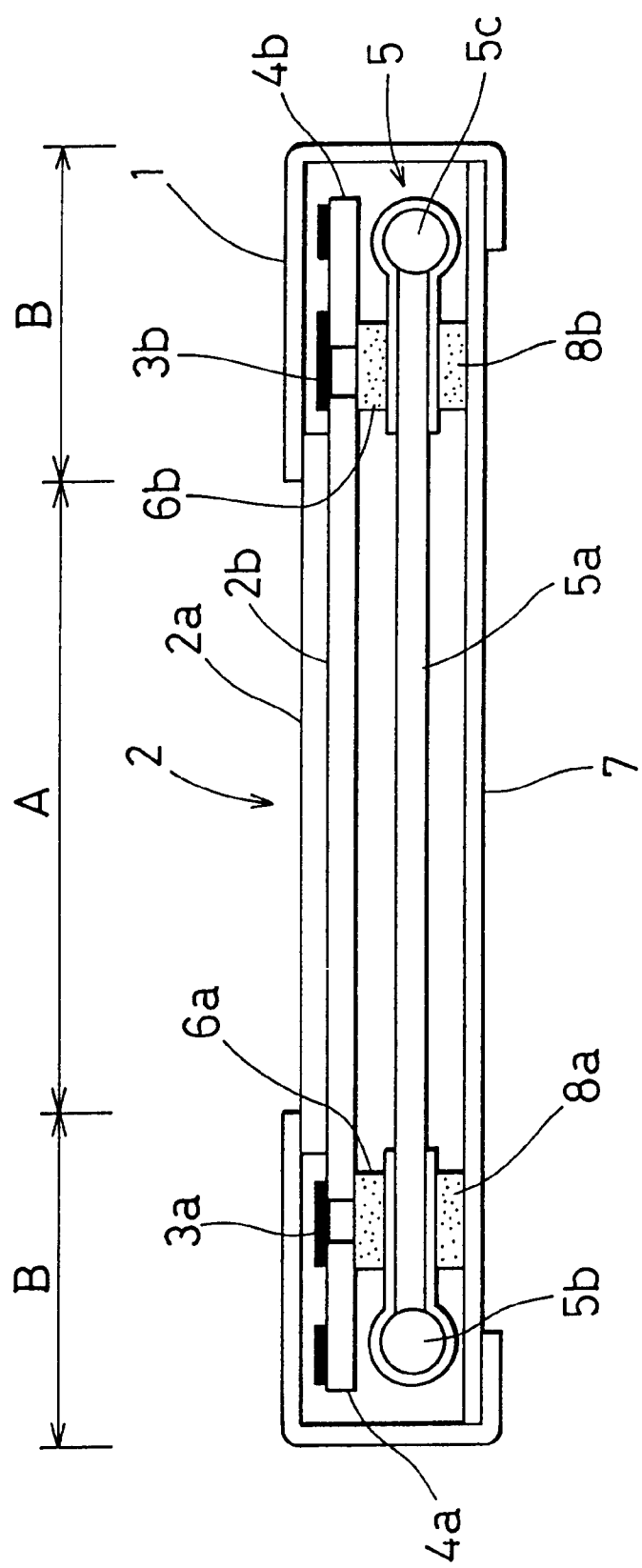
FIG. 1 is a cross-sectional view of a conventional liquid crystal display apparatus using a fluorescent lamp as the back light.
Figure 2:
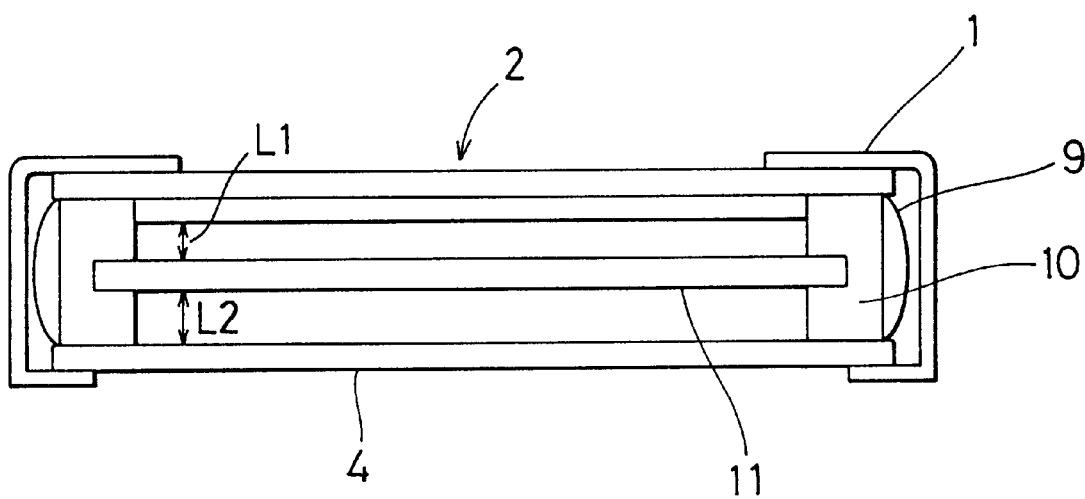
FIG. 2 is a cross-sectional view of a conventional liquid crystal display apparatus using an electroluminescence light source as the back light.
Figure 3:
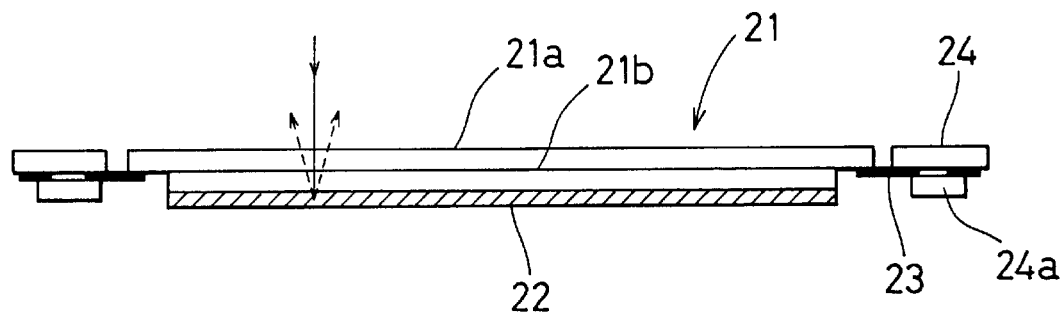
FIG. 3 is a cross-sectional view of a first embodiment of the present invention.

Referring to FIG. 3, there is shown the structure of a first embodiment of the present invention. A transparent electrode (not shown) such as an ITO electrode is formed on each of the opposite inner surfaces of two glass plates 21a and 21b. Liquid crystal (not shown) is enclosed between the glass plates 21a and 21b to form a liquid crystal panel 21. In the periphery of the liquid crystal panel 21, a circuit board 24 is arranged on which an electronic part 24a for driving the liquid crystal is mounted. The electronic part 24a is mounted on a flexible board 23 by the TAB method and connected to the terminal of an electrode formed in the periphery of the upper glass plate 21a.

A light emitting layer 22 is provided substantially over the entire under surface of the lower glass plate 21b. To form the light emitting layer 22, a paste-form material formed by dispersing a fluorescent material such as fluorescein and rhodamine in a transparent resin paste such as epoxy resin and acrylic resin is applied to the glass plate 21b and then hardened.

In the liquid crystal display apparatus of the above-described structure, the electronic part 24a provides a potential difference between the electrodes of the upper and lower glass plates 21a and 21b, so that a display pattern is formed on the liquid crystal panel 21. As shown by the solid arrow in FIG. 3, external light is transmitted by the liquid crystal panel 21 and incident on the light emitting layer 22, and the fluorescent material is supplied with energy by the incident light to emit fluorescence. The fluorescence is transmitted by the liquid crystal panel 21 as shown by the broken arrow in accordance with the display pattern formed on the liquid crystal panel 21. Thereby, the display pattern formed on the liquid crystal panel 21 is viewed by the eye of the viewer.

The light emitting layer 22 may be formed in the following manner: a resin paste or a rubber material in which a fluorescent material is mixed is molded into a film or a plate in advance, and the film or the plate is fixed to the glass plate 21b. Preferably, the resin or the rubber used as the material of the light emitting layer 22 becomes transparent after hardened. A pigment may be added to the light emitting layer 22 in order to add a color to the light irradiating the liquid crystal panel 21.

Figure 4:
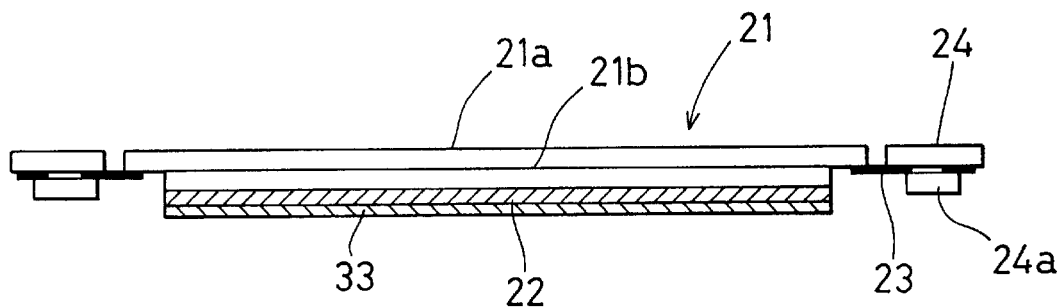
FIG. 4 is a cross-sectional view of a second embodiment of the present invention.

Referring to FIG. 4, there is shown the structure of a second embodiment of the present invention. In this embodiment, a light reflecting layer 33 is provided on the under surface of the light emitting layer 22 of the liquid crystal display apparatus described as the first embodiment. To form the light reflecting layer 33, a resin paste in which titanium dioxide is dispersed is applied to the light emitting layer 22 and then hardened.

In such a structure, of the fluorescence emitted by the light emitting layer 22, the light advancing upward is directly transmitted by the liquid crystal panel 21, and the light advancing downward is reflected by the titanium dioxide of the reflecting layer 33 and then advances upward and is transmitted by the liquid crystal panel 21. Thus, most of the light emitted by the fluorescent material is used for the illumination of the liquid crystal panel 21. Also, the external light transmitted by the liquid crystal panel 21 and incident on the light emitting layer 22 is reflected by the reflecting layer 33 and contributes to the illumination of the liquid crystal panel 21. This makes the display brighter.

Instead of the reflecting layer 33, a reflecting plate made of a material such as a metal may be arranged below the light emitting layer 22. In this case, the light emitting layer 22 and the reflecting plate may be in contact with each other or may be arranged opposite to each other with a gap between.

Figure 5:
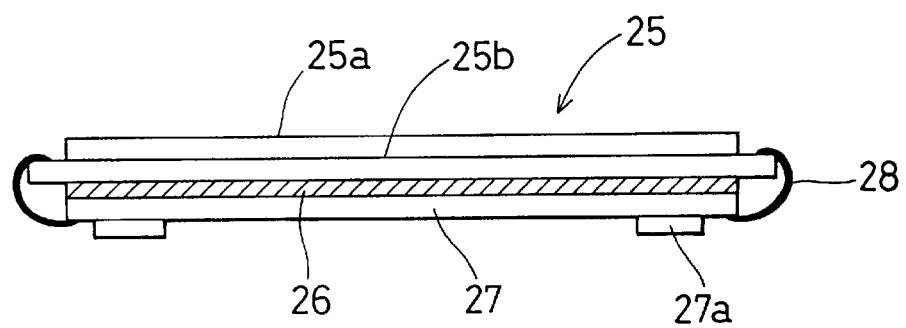
FIG. 5 is a cross-sectional view of a third embodiment of the present invention.

Referring to FIG. 5, there is shown the structure of a third embodiment of the present invention. Like the first embodiment, a light emitting layer 26 is provided on the under surface of a liquid crystal panel 25 including upper and lower glass plates 25a and 25b each having an ITO electrode at its inner surface and between which liquid crystal is enclosed. On the under surface of the light emitting layer 26, a circuit board 27 is provided on the under surface of which an electronic part 27a for driving the liquid crystal is mounted. The light emitting layer 26 is formed in the above-described manner: a resin paste containing a fluorescent material is applied and hardened. The circuit board 27 is pasted when the resin paste is hardened to obtain the above-mentioned structure. The electronic part 27a is connected to the electrode of the lower glass plate 25b through a conductive film 28 such as a flexible cable.

In such a structure, the electronic part 27a and the circuit board 27 are arranged not in the periphery of but at the back of the liquid crystal panel 25, so that the longitudinal and lateral sizes of the liquid crystal display apparatus can be reduced. Although the thickness of the display apparatus increases by the thickness of the circuit board 27 and the electronic part 27a, the size of the display apparatus is reduced as a whole.

A reflecting layer may be provided between the light emitting layer 26 and the circuit board 27. In this case, the circuit board 27 is pasted when the titanium dioxide containing resin paste used as the material of the reflecting layer is hardened. Alternatively, a circuit board having its upper surface light-reflection-processed in advance may be pasted to the light emitting layer 26.

Figure 6:
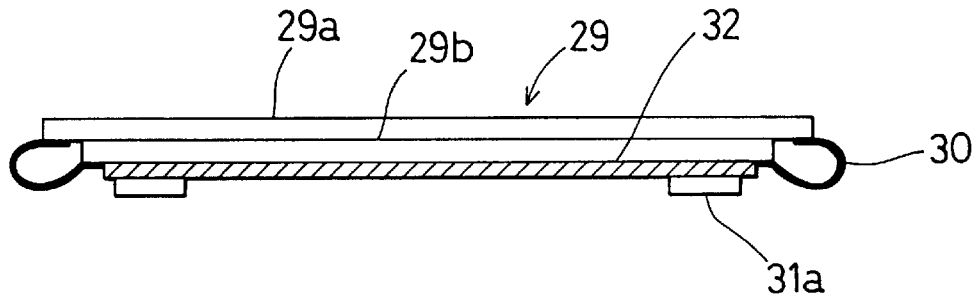
FIG. 6 is a cross-sectional view of a fourth embodiment of the present invention.

Referring to FIG. 6, there is shown the structure of a fourth embodiment of the present invention. As described previously, a liquid crystal panel 29 is formed by enclosing liquid crystal between upper and lower glass plates 29a and 29b. An ITO electrode is provided on each of the inner surfaces of the glass plates 29a and 29b. An anisotropic conductive light emitting layer 32 is arranged on the under surface of the lower glass plate 29b. The anisotropic conductive light emitting layer 32 contains a fluorescent material and absorbs light energy to emit fluorescence. The current flow is allowed only along the thickness of the anisotropic conductive light emitting layer 32.

Figure 7:
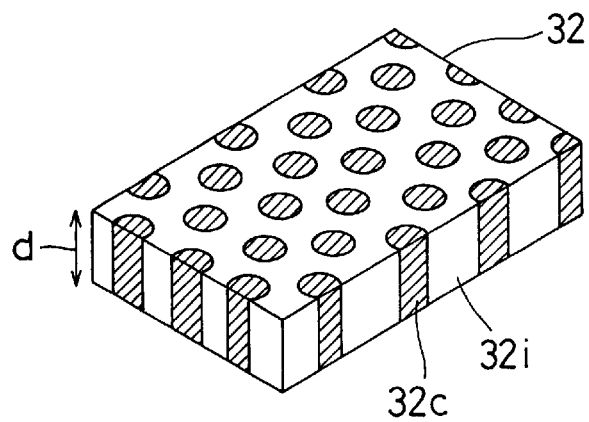
FIG. 7 is an enlarged cross-sectional view of an anisotropic conductive light emitting layer used in the fourth embodiment of the present invention.

Referring to FIG. 7, there is schematically shown an enlarged view of the structure of the anisotropic conductive light emitting layer 32. The anisotropic conductive light emitting layer 32 is of film form and includes conductive portions 32c and an insulating portion 32i having stickiness. The insulating portion 32i is made of an insulating resin or rubber material having stickiness in which a fluorescent material such as fluorescein and rhodamine is dispersed. To form the conductive portions 32c, a fluorescent material is dispersed in the same material as that of the insulating portion 32i, the powder of a metal or a conductive material such as carbon is mixed therein, and the material thus formed is molded into very fine fiber forms. A large number of conductive portions 32c are arranged in the insulating portion 32i along a thickness d so as to be separated from one another. The anisotropic conductive light emitting layer 32 of such a structure is pasted to the lower glass plate 29b of FIG. 6 by its own stickiness.

The electrode of the upper glass plate 29a is connected to one end of a conductive film 30 such as a flexible cable. The other end of the conductive film 30 is inserted between the lower glass plate 29b and the anisotropic conductive light emitting layer 32. An electronic part 31a for driving the liquid crystal is fixed to the under surface of the anisotropic conductive light emitting layer 32 corresponding to the end of the conductive film 30. The terminal of the electronic part 31a is connected to the conductive film 30 through the conductive portions 32c of the anisotropic conductive light emitting layer 32 and is further connected to the electrode of the upper glass plate 29a. The electronic part 31a may be fixed to the anisotropic conductive light emitting layer 32 by thermocompression bonding after the terminal of the electronic part 31a and the electrode are correctly connected.

In the above-described structure, the electronic part 30 provides a potential difference between the electrodes of the upper and lower glass plates 29a and 29b, so that a display pattern is formed on the liquid crystal panel 29. External light is transmitted by the liquid crystal panel 29 and incident on the anisotropic conductive light emitting layer 32, so that the fluorescent material contained in the anisotropic conductive light emitting layer 32 emits light. The emitted light is transmitted by the liquid crystal panel 29 in accordance with the display pattern formed on the liquid crystal panel 29, so that the display pattern is viewed.

Figure 8:
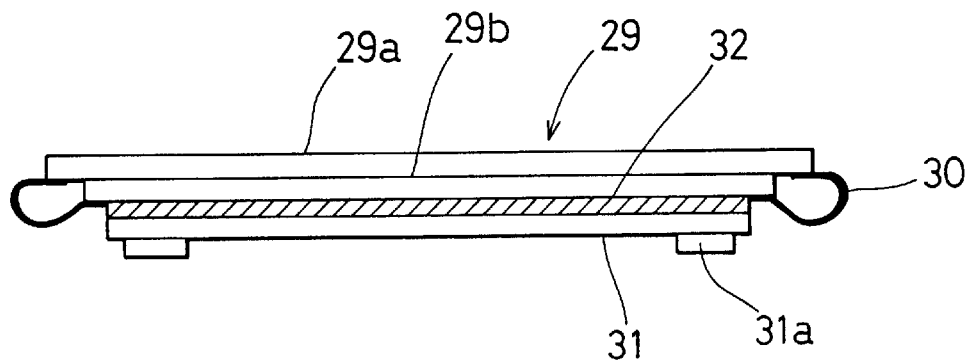
FIG. 8 is a cross-sectional view of a modification of the fourth embodiment.

According to the liquid crystal display apparatus of this embodiment, the electronic part 31a is arranged on the back surface side of the liquid crystal panel 29, so that the size of the display apparatus is reduced. In addition, the circuit board to mount the electronic part 31a thereon is not always necessary. When the electronic part 31a is used being mounted on the circuit board, the circuit board 31 can be arranged on the back surface side of the liquid crystal panel 29 as shown in FIG. 8, so that the size of the display apparatus is also reduced. In this case, for example, a through hole is formed in the circuit board 31, and the terminal of the electronic part 31a is drawn out to the upper surface of the circuit board 31 and brought into contact with the anisotropic conductive light emitting layer 32. A reflecting layer may be provided between the anisotropic conductive light emitting layer 32 and the circuit board 31 so that the liquid crystal panel 29 is illuminated more brightly.

As described above, in the liquid crystal display apparatus of the present invention, the fluorescence emitted by the light emitting layer functions as the back light. The liquid crystal display apparatus of the present invention can be said to be a liquid crystal display apparatus where the power source for the back light is deleted from the conventional transmission-type liquid crystal display apparatus and can also be said to be a reflection-type liquid crystal display apparatus effectively using external light. According to the structure of the present invention, the quantity of light transmitted by the liquid crystal panel increases to provide a bright display, and the contrast increases to provide a clear display pattern. In addition, the size and weight of a liquid crystal display apparatus and an electronic apparatus using the liquid crystal display apparatus can be reduced.

Obviously, many modifications and variations of the present invention are possible in light of the above teachings. It is therefore to be understood that within the scope of the appended claims, the invention may be practiced other than as specifically described.

What is claimed is:

1. A liquid crystal display apparatus comprising:
   a liquid crystal panel; and
   a light emitting layer provided on a back surface of said liquid crystal panel, said light emitting layer containing a fluorescent material caused to emit light by external light transmitted by said liquid crystal panel and incident on said light emitting layer.

2. A liquid crystal display apparatus according to claim 1, wherein a light reflecting layer is provided on a back surface of the light emitting layer.

3. A liquid crystal display apparatus comprising:
   a liquid crystal panel;
   an anisotropic conductive light emitting layer provided on a back surface of said liquid crystal panel, said anisotropic conductive light emitting layer containing a fluorescent material and a conductive material; and
   an electronic part, for driving said liquid crystal panel, arranged on a back surface of said anisotropic conductive light emitting layer.

\* \* \* \* \*